United States Patent
Liu et al.

(10) Patent No.: US 7,850,316 B2
(45) Date of Patent: Dec. 14, 2010

(54) ADJUSTING APPARATUS ASSEMBLY FOR PROJECTOR

(75) Inventors: Chang-Chun Liu, Shenzhen (CN);
 Xiao-Lin Gan, Shenzhen (CN);
 Yu-Kuang Ho, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 506 days.

(21) Appl. No.: 11/953,870

(22) Filed: Dec. 11, 2007

(65) Prior Publication Data

US 2009/0109410 A1 Apr. 30, 2009

(30) Foreign Application Priority Data

Oct. 26, 2007 (CN) .......................... 2007 1 0202286

(51) Int. Cl.
 *G03B 21/14* (2006.01)
(52) U.S. Cl. .......................... 353/119; 248/70; 248/157
(58) Field of Classification Search ................ 353/119; 108/5, 9, 29; 312/10.1; 242/393, 394, 419
See application file for complete search history.

(56) References Cited

U.S. PATENT DOCUMENTS

| 6,461,002 | B1 | 10/2002 | Su |
| 7,090,360 | B2 | 8/2006 | Kuroda et al. |
| 7,220,007 | B2 * | 5/2007 | Yang et al. ..................... 353/97 |
| 7,442,161 | B2 * | 10/2008 | Gainer ........................ 353/70 |
| 2006/0164612 | A1 * | 7/2006 | Chen et al. ................... 353/119 |
| 2009/0153810 | A1 * | 6/2009 | Liu et al. ..................... 353/119 |

FOREIGN PATENT DOCUMENTS

CN 1577056 A 2/2005

* cited by examiner

*Primary Examiner*—Tony Ko
(74) *Attorney, Agent, or Firm*—Frank R. Niranjan

(57) ABSTRACT

An adjusting apparatus is provided for a projector having a base. The adjusting apparatus includes a supporting member and a rotating member. The supporting member is partially received in the base of the projector and movably coupled to the base. The supporting member forms a plurality of teeth thereon. The rotating member is rotatably coupled to the base of the projector and partially exposed out of the base. The rotating member forms a plurality of teeth mating with the teeth of the supporting member, when the rotating member is rotated in either of two directions, the base of the projector correspondingly moves up and down relative to the supporting member.

11 Claims, 4 Drawing Sheets

ADJUSTING APPARATUS ASSEMBLY FOR PROJECTOR

BACKGROUND

1. Field of the Invention

The present invention relates to adjusting apparatuses for projectors, and more particularly to an adjusting apparatus for adjusting elevation and depression angles of a projector.

2. Description of Related Art

With the development of electronic technology, projectors have come into wide use in multimedia presentations. Typically, a projector includes an adjusting apparatus installed at a front section or a rear section of the bottom of the projector, for adjusting elevation and depression angles of the projector to meet the needs of a user. The adjusting apparatus includes a foot movably supporting a shell of the projector, and a button. Pressing the button, the foot is moved up or down relative to the shell of the projector. When the projector is adjusted to a proper elevation or depression angle, the button is released and locks the foot to the shell. However, when the button is pressed by one hand of a user, the user needs to support the shell with the other hand and raise or descend the shell relative to the foot. It is difficult and inconvenient.

What is needed, therefore, is an adjusting apparatus which facilitates convenient adjusting elevation and depression angles of a projector.

SUMMARY

An exemplary adjusting apparatus is provided for a projector having a base. The adjusting apparatus includes a supporting member and a rotating member. The supporting member is partially received in the base of the projector and movably coupled to the base. The supporting member forms a plurality of teeth thereon. The rotating member is rotatably coupled to the base of the projector and partially exposed out of the base. The rotating member forms a plurality of teeth mating with the teeth of the supporting member, when the rotating member is rotated in either of two directions, the base of the projector correspondingly moves up and down relative to the supporting member.

Other advantages and novel features will become more apparent from the following detailed description of embodiment when taken in conjunction with the accompanying drawings, in which:

DETAILED DESCRIPTION

Figure 1:
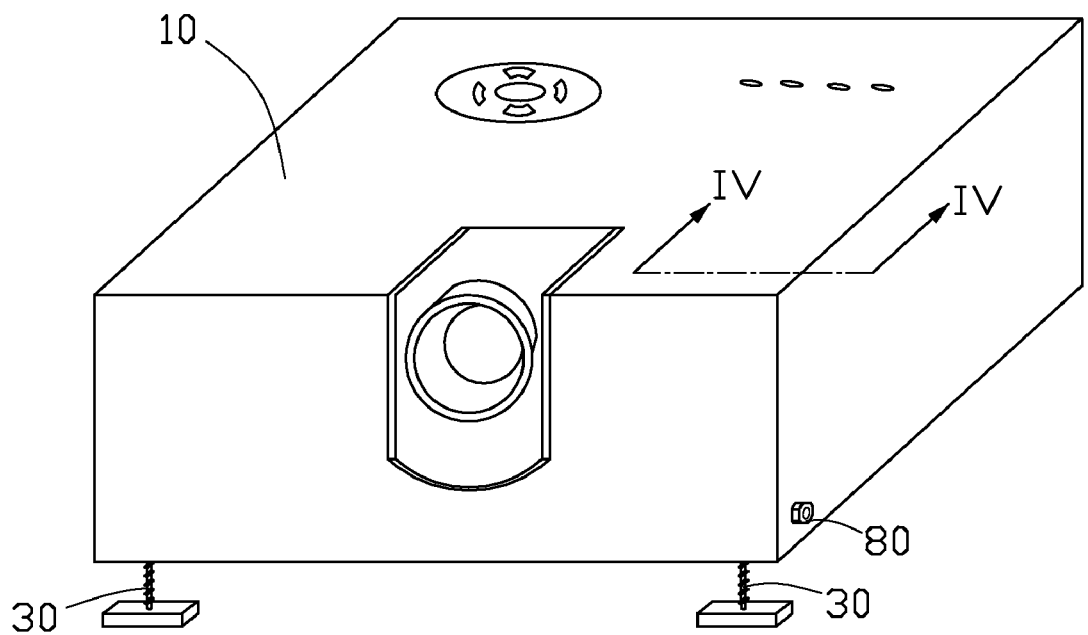
FIG. 1 is an assembled view of an adjusting apparatus with a shell of a projector in accordance with an embodiment of the present invention.
Figure 2:
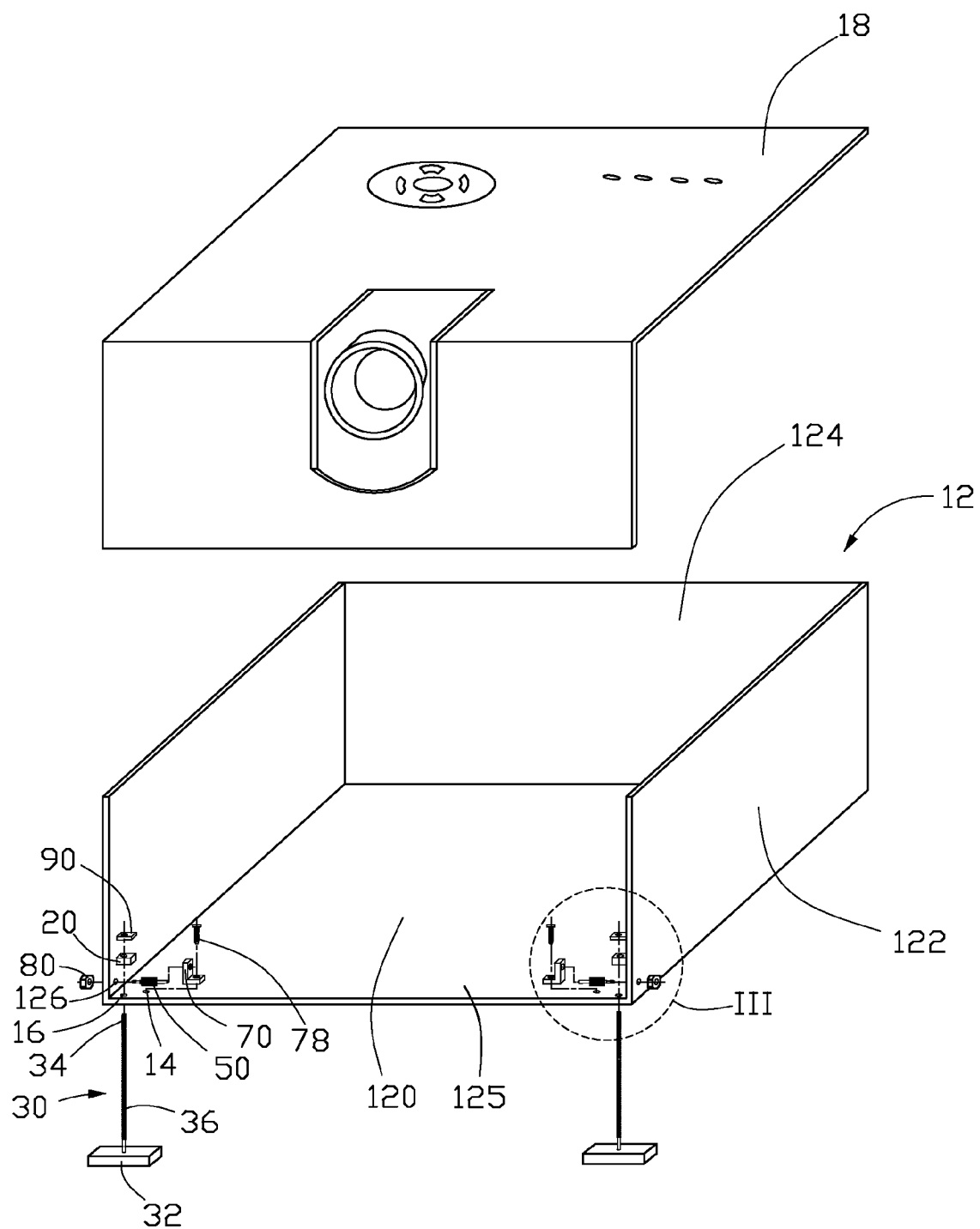
FIG. 2 is an exploded, isometric view of FIG. 1.

Referring to FIGS. 1 and 2, an adjusting apparatus is provided in accordance with an embodiment of the present invention for adjusting elevation and depression angles of a projector 10. The adjusting apparatus includes two mechanisms, and each mechanism includes a supporting member 30, a rotating member 50, an L-shaped fixing member 70, an operating member 80 defining a threaded hole 800 therein, and a stop plate 90 defining a threaded hole 900 therein.

Figure 3:
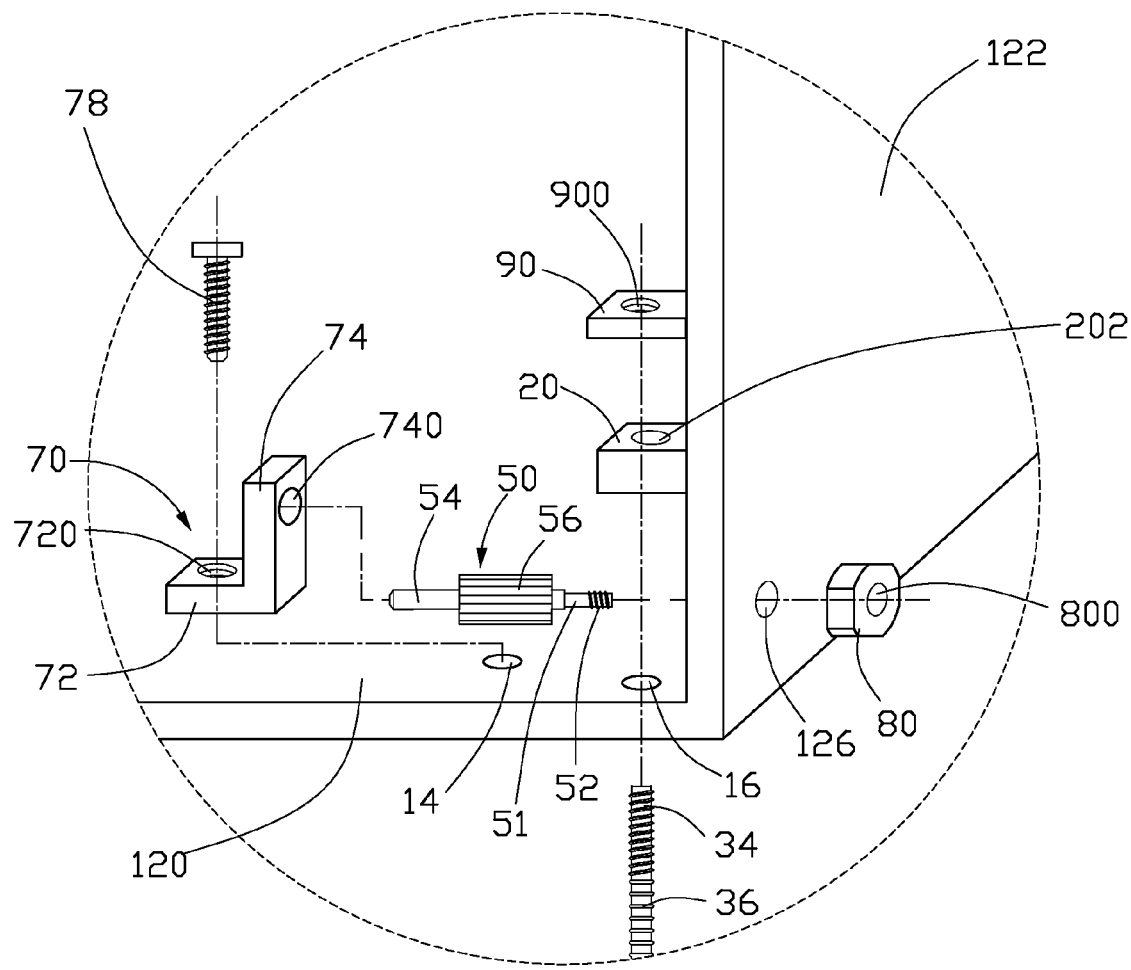
FIG. 3 is an enlarged isometric view of a circled portion III of FIG. 1.

Referring also to FIG. 3, the projector 10 includes a base 12, and a cover 18. The base 12 includes a bottom wall 120, two opposite sidewalls 122 perpendicular to the bottom wall 120, and a rear wall 124 connected between the sidewalls 122. A front portion 125 of the bottom wall 120 opposite to the rear wall 124 defines two fixing holes 14 adjacent to the sidewalls 122 respectively. A through hole 16 is defined in the front portion 125 between each fixing hole 14 and the corresponding sidewall 122 adjacent to the fixing hole 14. A pivoting hole 126 is defined in a lower portion of each sidewall 122 adjacent to the front portion 125 of the bottom wall 120. Two protrusions 20 are formed on inside surfaces of the sidewalls 122 above the pivoting holes 126 respectively. Each protrusion 20 defines a bore 202 aligned with the corresponding through hole 16 of the bottom wall 120.

Each supporting member 30 includes a foot 32 formed at one end thereof, and a threaded portion 34 at the opposite end thereof. A plurality of teeth 36 is formed on a middle portion of each supporting member 30.

Each rotating member 50 includes a main body 56 forming a plurality of teeth therein. A pole 51 extends from one end of the main body 56, and a post 54 extends from the opposite end of the main body 56. A free end of the pole 51 forms a threaded portion 52 thereon.

Each fixing member 70 includes a fixing portion 72, and a pivoting portion 74 perpendicular to the fixing portion 72. A threaded hole 720 is defined in the fixing portion 72, and a pivoting hole 740 is defined in the pivoting portion 74.

Figure 4:
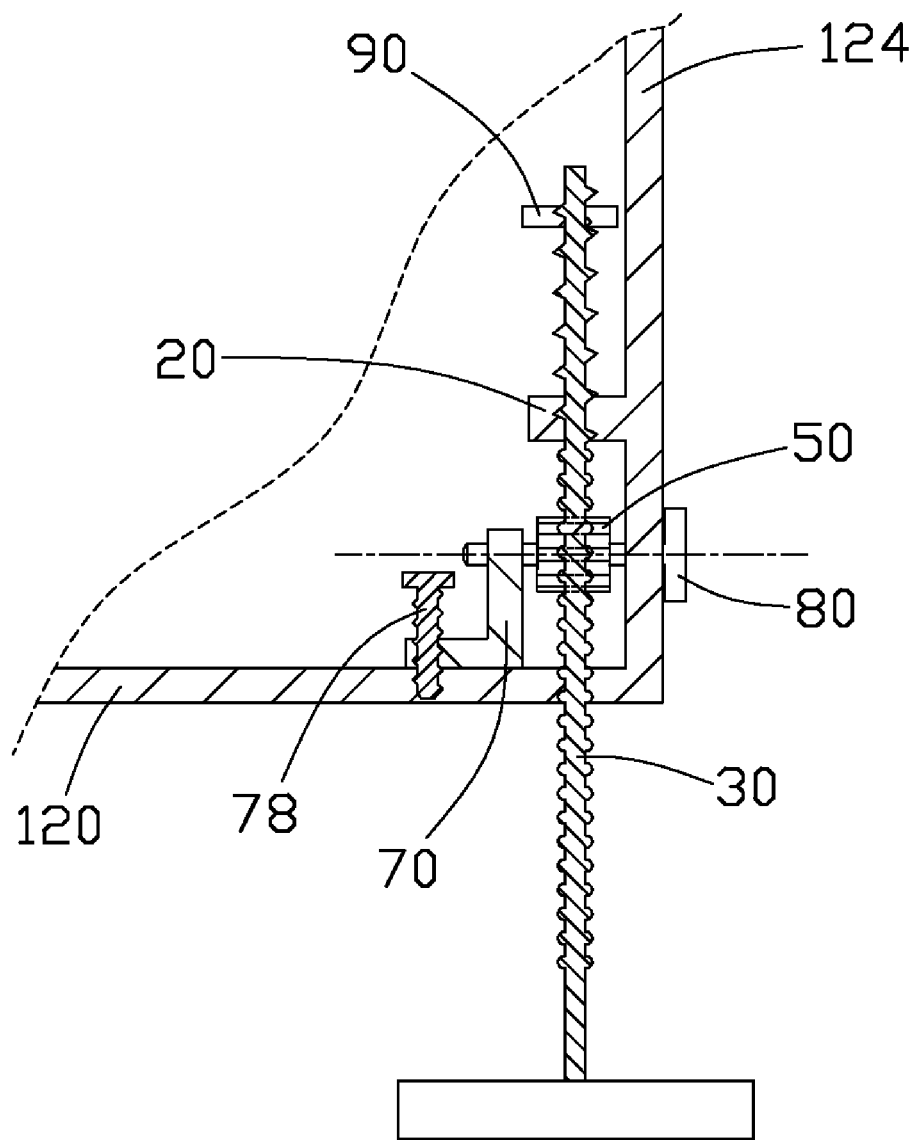
FIG. 4 is a partially cross-sectional view taken along line IV-IV of FIG. 1.

Referring further to FIG. 4, in assembly, each supporting member 30 is extended through the corresponding through hole 16 of the bottom wall 120, and the bore 202 of the protrusion 20 of the corresponding sidewall 122. The stop plates 90 are rotated to allow the threaded portions 34 of the supporting members 30 to engage in the threaded holes 900 of the stop plates 90 respectively. Thereby, the stop plates 90 are coupled to the supporting members 30 respectively, for preventing the supporting members 30 from disengaging from the protrusions 20 of the sidewalls 122 respectively. The poles 51 of the rotating members 50 are extended out of the sidewalls 122 respectively through the pivoting holes 126 of the sidewalls 122. The operating members 80 are rotated, the threaded portions 52 of the poles 51 engage in the threaded holes 800 of the operating members 80 respectively. Thereafter, the posts 54 of the rotating members 50 are extended through the pivoting holes 740 of the fixing members 70 respectively. Two screws 78 are extended through the threaded holes 720 of the fixing members 70 and then engage in the through holes 14 of the bottom wall 120 respectively. Thereby, the fixing members 70 are fixed to the bottom wall 120 of the base 12, and the rotating members 50 are rotatably coupled between the corresponding fixing members 70 and sidewalls 122 respectively. The teeth of the main bodies 56 of the rotating members 50 engage in the teeth 36 of the supporting members 30 respectively.

The ejector 10 is placed on a plane, with the feet 32 of the supporting members 30 and a rear portion of the bottom wall 120 contacting the plane. When there is a need to adjust the elevation or depression angle of a projector 10, the operating members 80 are rotated together or in turn. The rotating members 50 rotate together with the operating members 80 to drive the corresponding supporting members 30 to move up or down relative to the projector 10 respectively. Thereby, a front portion of the ejector 10 is moved down or up relative to the feet on the plane, and the elevation or depression angle of the projector 10 is changed.

It is believed that the present embodiment and its advantages will be understood from the foregoing description, and it will be apparent that various changes may be made thereto without departing from the spirit and scope of the invention or sacrificing all of its material advantages, the example hereinbefore described merely being preferred or exemplary embodiment of the invention.

What is claimed is:

1. An adjusting apparatus assembly comprising: a projector having a base,
   a supporting member partially received in the base of the projector and movably coupled to the base, the supporting member forming a plurality of teeth thereon, the base comprising a sidewall defining a pivoting hole;
   a fixing member mounted to the base, and defining a pivoting hole in alignment with the pivoting hole of the sidewall; and
   a rotating member rotatably coupled to the sidewall of the base and the fixing member, the rotating member comprising a pole and a post extending from opposite ends of the rotating member, the pole rotatably engaged in the pivoting hole of the sidewall, and the post rotatably engaged in the pivoting hole of the fixing member, the rotating member forming a plurality of teeth mating with the teeth of the supporting member, wherein when the rotating member is rotated in either of two directions, the base of the projector correspondingly moves up and down relative to the supporting member.

2. The adjusting apparatus assembly as claimed in claim 1, wherein the base comprises a bottom wall, the sidewall is perpendicular to the bottom wall, the bottom wall defines a through hole therein, an inside surface of the sidewall forms a protrusion, and the protrusion defines a bore aligning with the through hole, one end of the supporting member is extended through the through hole of the bottom wall and the bore of the protrusion.

3. The adjusting apparatus assembly as claimed in claim 2, wherein a stop plate is connected to the end of the supporting member for preventing the supporting member from disengaging from the protrusion of the sidewall.

4. The adjusting apparatus assembly as claimed in claim 2, wherein the pole is extended through the pivoting hole of the sidewall and exposed out of the sidewall, and an operating member is connected to a free end of the pole of the rotating member.

5. The adjusting apparatus assembly as claimed in claim 4, wherein the fixing member is installed on the bottom wall, the fixing member comprises a pivoting portion perpendicular to the bottom wall, the pivoting hole is defined in the pivoting portion.

6. The adjusting apparatus assembly as claimed in claim 2, wherein the supporting member forms a foot at the opposite end thereof for supporting the projector.

7. An adjusting apparatus assembly comprising:
   a projector shell, the projector shell comprising a sidewall defining a pivoting hole,
   a fixing member mounted to the projector shell, and defining a pivoting hole, and
   a rotating member rotatably supported in the projector shell and manipulated from outside of the projector shell, the rotating member bi-directionally rotatable around a first axis; the rotating member comprising a pole and a post extending from opposite ends of the rotating member, wherein the pole is rotatably engaged in the pivoting hole of the sidewall, and the post is rotatably engaged in the pivoting hole of the fixing member; and
   a supporting member extended into the projector shell to mate with the rotating member, the supporting member correspondingly linearly moving up and down along a second axis perpendicular to the first axis when the rotating member is rotated.

8. The adjusting apparatus assembly of claim 7, wherein the rotating member comprises a main body forming a plurality of teeth therein, the supporting member forming a plurality of teeth mating with the teeth of the rotating member, when the rotating member is rotated in either of two directions, the base of the projector correspondingly moves up and down relative to the supporting member.

9. The adjusting apparatus assembly of claim 8, wherein the pole extends from one end of the main body, the pole is extended through the pivoting hole of the sidewall and engaged with an operating member exposed out of the sidewall.

10. The adjusting apparatus assembly of claim 9, wherein the free end of the pole forms a threaded portion thereon, the operating member defines a threaded hole, the threaded portion engages in the threaded hole.

11. The adjusting apparatus assembly of claim 8, wherein the post extends from an opposite end of the main body, the projector shell further comprises a bottom wall perpendicular to the sidewall, the fixing member is installed on the bottom wall, the fixing member comprises a pivoting portion perpendicular to the bottom wall, the pivoting hole is defined in the pivoting portion.

* * * * *